Feb. 1, 1927. Re. 16,539

T. HAMM

CEMENT GUN NOZZLE

Original Filed Jan. 15, 1923

Inventor
THOMAS HAMM by Marks & Clerk
Atty's

Reissued Feb. 1, 1927. Re. 16,539

UNITED STATES PATENT OFFICE.

THOMAS HAMM, OF HAWTHORNE, CALIFORNIA.

CEMENT-GUN NOZZLE.

Original No. 1,507,773, dated September 9, 1924, Serial No. 612,851, filed January 15, 1923. Application for reissue filed August 26, 1926. Serial No. 131,795.

This invention relates to a nozzle for use in building structures of cement or plastic material by spraying the same under pressure upon a background. The present invention pertains more particularly to the tip portion of the nozzle at the outlet side or the portion where water is supplied.

In operations of this character a mixture of cementitious material in a relatively dry form is blown into a nozzle. In its passage through the nozzle, water is supplied thereto and mixed therewith, to form a wet cement or concrete, which issues therefrom and is directed in a stream and at a high velocity upon the background. Under these conditions the cement is impacted upon the background and pneumatically rammed to form a dense cementitious mass. The nozzles as at present used, are tapered to a smaller diameter at the exit or discharge end, water being admitted transverse to the axis of the nozzle at the larger end. Careful mixing of the ingredients of the cement or plastic material is required before admission to this type of nozzle. As the wet mixture issues from the nozzle it tends to spread. A primary object of this invention is to provide a nozzle which will produce a more thorough mixing of the ingredients of the cement mixture and a more thorough hydration of the material, and at the same time reduce the amount of spreading and rebound.

Figure 1:
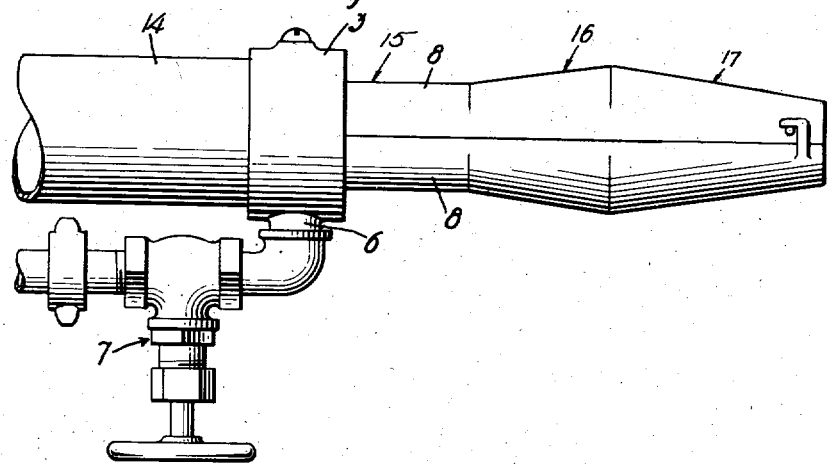
Figure 2:
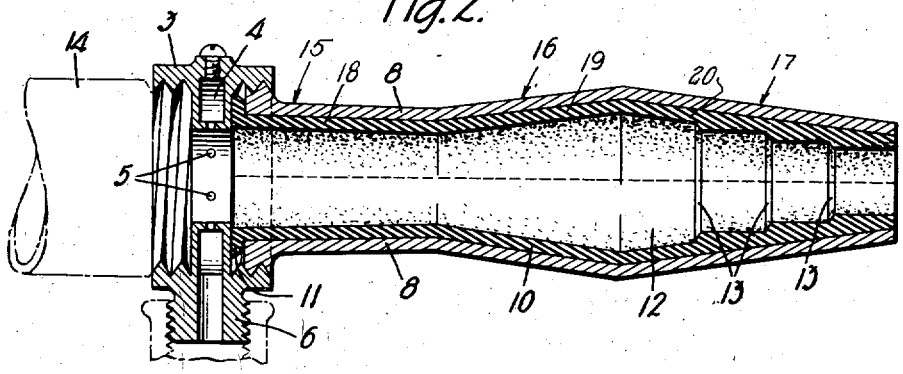

This object together with other objects and corresponding accomplishments are obtained by means of the embodiment of my invention illustrated in the accompanying drawing, in which:

Fig. 1 is a side elevation of a nozzle; and Fig. 2 is an axial section therethrough.

Referring more particularly to the drawing, a water ring is indicated by 3. It is provided with threaded bores separated by an annular water chamber 4 having spaced openings 5 to direct water inwardly. A threaded nipple 6 serves for a connection to a water line indicated generally by 7. The nozzle tip may be formed by two sections 8, which when placed together form a cylindrical member having a base or enlarged portion 9 threaded for mounting in the ring 3.

Within the tip is a cylindroidal lining 10 of yielding or soft resilient material, preferably rubber. This lining has a flange 11 at the bottom, which is clamped between the ring and the base of the tip. The cylindroidal bore of the lining is tapered from its lower end, decreasing in diameter to its junction with a mixing chamber indicated generally by 12. This chamber is formed by flaring the bore outwardly to a larger diameter then tapering inwardly. Near the upper or outer end, there are formed annular shoulders 13 which act as chokes. Certain inventive features reside in the construction of the nozzle to provide the enlarged mixing chamber and in the provision of the chokes.

The cementitious ingredients, such as sand and cement are blown under elastic fluid pressure through a hose 14 into the ring 3. Water passes through the water line 7 and apertures 5 to the cement and sand. The cement, water and sand are mixed in their passage along the lower tapered portion of the nozzle and spread as they enter the mixing chamber portion 12. Here a more intimate mixture of the ingredients is obtained. Such intimate mixing may result partly from the shape of the interior passage and partly from the use of the yieldable liner which effects the rebound of the material thrown thereagainst. The wet cement mixture then passes through the portion of the nozzle containing the chokes. These contract the stream and at the same time assist in mixing and hydrating. The cement mixture finally issues in a compact stream without any substantial spreading.

In the preferred form of the nozzle shown on the drawings, the sections 8 of the nozzle tip are so formed as to provide a portion 15 having a bore decreasing in cross-section away from the water ring 3, a portion 16 forming a continuation of portion 15 and having a bore increasing in cross-section away from the portion 15, and a portion 17 having a bore decreasing in cross-section away from the portion 16 and cooperating with the bore of the portion 16 to provide space for the mixing chamber 12. The lining 10 also comprises three portions 18, 19 and 20, the first of which has a bore decreasing in cross-section away from the water ring 3, the second of which has a bore increasing in section away from the water ring, and the third of which decreases in cross-section away from the water ring.

The nozzle of the present invention is particularly adapted for use as the nozzle of a "cement gun" from which the mixture is usually expelled by means of compressed air although other suitable elastic fluids or gases may obviously be used.

It should be understood that the present embodiment of the invention is merely illustrative and that various changes may be made without departing from the true spirit and scope of the invention.

What I claim is:

1. A "cement gun" nozzle having a cylindroidal passage provided with an annular choke shoulder adjacent its discharge end.

2. A "cement gun" nozzle having a cylindroidal lining provided internally with an annular choke shoulder adjacent its discharge end.

3. A "cement gun" nozzle having a passage with a mixing chamber of larger diameter intermediate its ends, a portion contracting from said mixing chamber towards the discharge end of said nozzle, and an annular choke shoulder in said passage adjacent said discharge end.

4. A "cement gun" nozzle having a passage contracting from the inlet end towards the discharge end, a mixing chamber of larger diameter intermediate its ends, and an annular choke shoulder in said passage adjacent the discharge end.

5. A "cement gun" nozzle having a lining provided with a passage having a mixing chamber of larger diameter intermediate its ends, a portion contracting from said mixing chamber toward the discharge end, and an annular choke shoulder in said passage adjacent the discharge end.

6. A "cement gun" nozzle having a lining provided with a passage expanding from the inlet end toward the discharge end, a mixing chamber of larger diameter intermediate its ends, a portion contracting from said mixing chamber toward the discharge end, and an annular choke shoulder in said passage adjacent said discharge end.

7. A nozzle adapted to effect thorough mixing of cementitious material shot therefrom, having a passage with a portion increasing in cross-section toward the outlet end of the nozzle and a second portion decreasing in cross-section toward the outlet end of the nozzle and cooperating with the first mentioned portion to provide a mixing chamber, and comprising means at the inlet side of said chamber to direct said cementitious material into said chamber, and means at the inlet side of said chamber for injecting liquid into said cementitious material before it passes into the mixing chamber.

8. A nozzle adapted to effect through mixing of cementitious material shot therefrom, having a passage therethrough comprising a mixing chamber of larger cross-section intermediate its ends, a portion at the entrance side of said chamber and increasing in cross-section toward the outlet end of the nozzle, and a portion at the outlet end of said chamber and decreasing in cross-section toward the outlet end of the nozzle, and comprising means at the inlet side of said chamber to direct said cementitious material into said chamber, and means at the inlet side of said chamber for injecting liquid into said cementitious material before it passes into the mixing chamber.

9. A nozzle adapted to effect thorough mixing of cementitious material driven therethrough, comprising a casing provided with a passage extending therethrough and having a portion decreasing in cross-section toward the exit end, a mixing chamber connected with the exit end of said portion increasing in cross-section, and a portion at the exit end of said chamber and decreasing in cross-section toward the outlet of the nozzle.

10. A nozzle adapted to effect thorough mixing of cementitious material, comprising a casing having a passage therethrough and a lining for said passage of soft resilient material adapted to resist the destructive action of the cementitious material and provide a passage successively contracting, expanding and contracting in cross-section.

11. A nozzle adapted to effect thorough mixing of cementitious material driven therethrough, having a casing having a passage therethrough including a mixing chamber of larger diameter intermediate its ends, a portion at the entrance of said chamber and increasing in diameter toward the outlet end of the nozzle and a portion at the exit side of said chamber and contracting toward the outlet of said nozzle; and comprising a lining of soft resilient material for the portion of said passage at the exit side of said chamber, means at the inlet side of said mixing chamber to direct cementitious material into said chamber, and means at the inlet side of said chamber to inject water into the stream of cementitious material directed into said chamber.

12. A nozzle adapted to effect thorough mixing of cementitious material shot therefrom, including a substantially rigid casing, and a lining of soft resilient material having a passage decreasing in diameter from the inlet end to a mixing chamber portion in which the diameter increases and then decreases to the nozzle outlet end.

13. A nozzle adapted to effect thorough mixing of cementitious material shot therefrom, having a lining of soft resilient material provided with a passage expanding from a given point toward the discharge end and then contracting toward the discharge end, the portion of the passage between the expanding and contacting portion of the passage serving as a mixing chamber, and comprising means at the inlet side of said chamber to direct said cementitious material into said chamber, and means at the inlet side of said chamber for injecting liquid into said cementitious material before it passes into the mixing chamber.

14. A nozzle adapted to effect thorough mixing of cementitious material shot therefrom, having a passage with a conical inlet portion decreasing in diameter toward the outlet end, a conical intermediate portion increasing in diameter toward the outlet end, and a conical outlet portion decreasing in diameter toward the outlet end and cooperating with said intermediate portion to provide a mixing chamber.

15. A nozzle adapted to effect thorough mixing of cementitious material, having a passage therethrough, successively contracting, expanding and contracting in cross-section and adapted to contract, expand and contract a stream of hydrated cementitious material flowing therethrough, and comprising means at the inlet side of said chamber to direct said cementitious material into said chamber, and means at the inlet side of said chamber for injecting liquid into said cementitious material before it passes into the mixing chamber.

In witness whereof, I affix my signature.

THOMAS HAMM.